(12) United States Patent
Shimizu

(10) Patent No.: US 6,291,107 B1
(45) Date of Patent: Sep. 18, 2001

(54) NON-AQUEOUS ELECTROLYTE BATTERY

(75) Inventor: Ryuichi Shimizu, Yokohama (JP)

(73) Assignee: NEC Moli Energy Corp, Yokohama (JP)

( * ) Notice: Subject to any disclaimer, the term of this patent is extended or adjusted under 35 U.S.C. 154(b) by 0 days.

(21) Appl. No.: 09/385,967

(22) Filed: Aug. 30, 1999

(30) Foreign Application Priority Data

Aug. 31, 1998 (JP) .................................................. 10-245332

(51) Int. Cl.$^7$ ...................................................... H01M 6/16
(52) U.S. Cl. ........................... 429/324; 429/58; 429/137; 429/189; 429/215; 429/216; 429/324
(58) Field of Search .................... 429/137, 189, 429/215, 216; 205/58, 317

(56) References Cited

U.S. PATENT DOCUMENTS 5,254,631 * 10/1993 Yamamoto et al. .................. 525/278
5,721,069 * 2/1998 Shoji et al. ........................... 429/213
5,997,714 * 12/1999 Hamahara et al. .................. 205/290

OTHER PUBLICATIONS

Patent Abstracts of Japan, Abstract of JP 04087156 A dated Mar. 19, 1992.
Patent Abstracts of Japan, Abstract of JP 07122296 A dated May 12, 1995.
Patent Abstracts of Japan, Abstract of JP 10092221 A dated Apr. 10, 1998.
Patent Abstracts of Japan, Abstract of JP 10092222 A dated Apr. 10, 1998.
Patent Abstracts of Japan, Abstract of JP 10106624 A dated Apr. 24, 1998.

* cited by examiner

*Primary Examiner*—Gabrielle Brouillette
*Assistant Examiner*—Dah-Wei D. Yuan
(74) *Attorney, Agent, or Firm*—Armstrong, Westerman, Hattori, McLeland & Naughton, LLP

(57) ABSTRACT

The invention provides a non-aqueous electrolyte battery using a carbonaceous material capable of doping or dedoping lithium for an anode, a composite oxide comprising lithium and a transition metal for a cathode, and a non-aqueous electrolyte obtained by dissolving a carrier salt in a non-aqueous solvent as an electrolyte. The non-aqueous electrolyte comprises at least one monomer selected from the group consisting of isoprene, styrene, 2-vinylpyridine, 1-vinylimidazole, butyl acrylate, ethyl acrylate, methyl methacrylate, N-vinylpyrrolidone, ethyl cinnamate, methyl cinnamate, ionone, and myrcene, which, upon charging, forms a film on the surface of the anode.

4 Claims, 2 Drawing Sheets

NON-AQUEOUS ELECTROLYTE BATTERY

BACKGROUND OF THE INVENTION

The present invention relates generally to a non-aqueous electrolyte secondary battery making use of lithium ions, and more specifically to a battery improved in terms of charge-and-discharge performance by the addition of a specific material to a non-aqueous electrolyte.

With the recent increasing prevalence of portable electronic equipment such as portable phones, camcorders and notebook PCs, there are increased demands for batteries having high energy densities, especially non-aqueous electrolyte batteries. In particular, rechargeable lithium ion batteries of great safety are now widely used as batteries of small size yet high energy densities.

To allow non-aqueous electrolyte batteries such as lithium batteries, lithium secondary batteries and lithium ion secondary batteries to have high battery performance, it is of vital importance to inhibit reactions of electrodes with electrolytes. It is particularly important to inhibit the reaction of an anode with an electrolyte because the anode going down to very base potentials is likely to react with the electrolyte. This has some considerable influences on battery performance, especially battery capacity, battery storability, and secondary battery's cycling characteristics.

Thus, many solvents less susceptible to battery degradation due to reactions with anodes or their combinations are now investigated for non-aqueous solvents for non-aqueous electrolyte batteries while reactivities with anodes in particular are taken into account. Other considerations required for what solvent is selected are solubilities of electrolyte carrying salts, reactivities of electrolytes with cathodes, ion conductivity, and costs.

For non-aqueous solvents for lithium ion secondary batteries, organic solvents such as ethylene carbonate, dimethyl carbonate, methyl ethyl carbonate, γ-butyrolactone, methyl propionate, butyl propionate and ethyl propionate are used singly or in combination of two or more.

There are also many attempts to incorporate specific compound additives to an electrolyte and thereby improve battery performance.

Although depending on the type of the electrolyte used, however, it is often impossible for an anode material to make full use of its own performance due to the reaction of the anode with the electrolyte. A problem with this case is that battery performance, especially battery capacity, battery storability and secondary battery's cycling performance remain low.

It has also been proposed to add additives to electrolytes so as to inhibit the reactions of anodes with the electrolytes. However, a problem with these additives is that some additives thereof have adverse influences on not only the reactions of the anodes with the electrolytes but also battery reactions, failing to obtain voltages or currents that batteries have to provide.

JP-A 8-96852 discloses a battery using an anode comprising a material capable of doping or dedoping metal lithium or lithium, with vinylene carbonate incorporated in a non-aqueous solvent. When the vinylene carbonate is applied to a battery comprising a carbonaceous material anode, however, no sufficient battery performance improvement is achievable due to insufficient film formation capabilities.

An object of the present invention is to provide a battery making use of lithium ions, in which the reaction of an anode with an electrolyte can be substantially inhibited with no degradation of battery performance.

SUMMARY OF THE INVENTION

Figure 1:
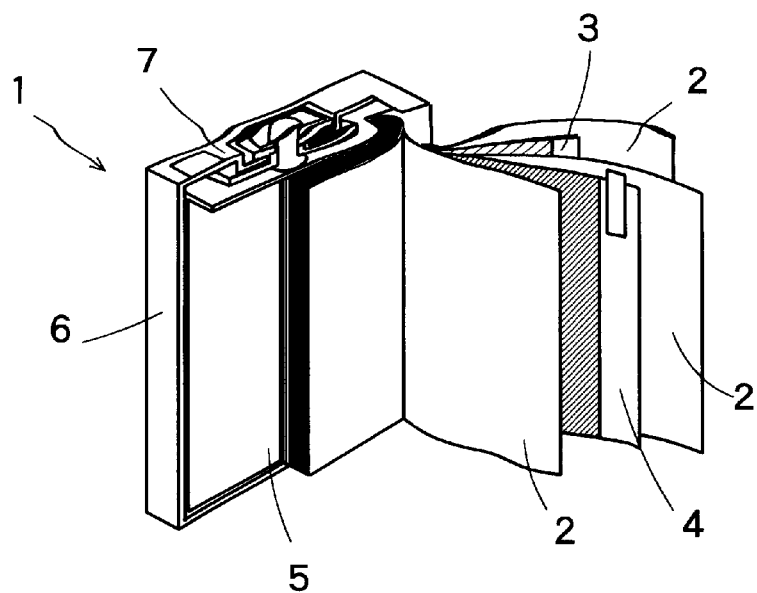
FIG. 1 is a partly cut-away perspective view illustrative of one exemplary lithium ion battery.

The present invention provides a non-aqueous electrolyte battery comprising an anode of a carbonaceous material capable of doping and dedoping lithium, wherein a non-aqueous electrolyte comprises at least one monomer capable of anionic polymerization (hereinafter referred to as an anionic polymerizable monomer) which, upon charging, forms a film on the surface of the carbonaceous material anode.

In the non-aqueous electrolyte battery of the invention, it is preferable that the anionic polymerizable monomer is an aprotic organic compound represented by formula 1 or 2 given below.

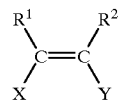

Formula 1

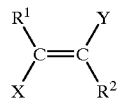

Formula 2

Here $R^1$ and $R^2$ are each a hydrogen atom or an alkyl group, X is a hydrogen atom or a group electronically conjugated to a skeletal double bond and Y is a hydrogen atom or a group having a greater electron attractive action on the skeletal double bond than the hydrogen atom with the exception that both X and Y are hydrogen atoms at the same time.

Preferably, the anionic polymerizable monomer should be at least one monomer selected from the group consisting of isoprene, styrene, 2-vinylpyridine, 1-vinylimidazole, butyl acrylate, ethyl acrylate, methyl methacrylate, N-vinylpyrrolidone, ethyl cinnamate, methyl cinnamate, ionone, and myrcene.

In the non-aqueous electrolyte battery of the invention, it is preferable that the anionic polymerizable monomer is a nature identical monomer or a synthetic monomer started from said nature identical monomer.

In the non-aqueous electrolyte battery of the invention, it is preferable that a cathode active material comprises at least one composite oxide comprising at least one transition metal selected from the group consisting of cobalt, manganese and nickel, and lithium.

DESCRIPTION OF THE PREFERRED EMBODIMENT

The present invention provides a non-aqueous battery using a carbonaceous material capable of doping and dedoping lithium for an anode, a composite oxide comprising lithium and a transition metal for a cathode, and a non-aqueous electrolyte obtained by dissolving a carrier salt in a non-aqueous solvent as a electrolyte, so that any unnecessary reaction of the carbonaceous anode with the electrolyte during charging can be prevented.

Especially in the invention, the non-aqueous electrolyte comprises at least one anionic polymerizable monomer which, upon charging, forms a film on the surface of the carbonaceous anode.

In the invention, it is preferable to use the anionic polymerizable monomer because it provides rapid formation of film on the carbonaceous anode due to its reaction rate being faster than that of a monomer capable of ring-opening anionic polymerization.

In the invention, the group electronically conjugated to the skeletal double bond, as represented by formula 1 or 2, includes a vinyl group, a phenyl group, an aromatic ring or the like.

The group having a greater electron attractive action on the skeletal double bond than the hydrogen atom, for instance, includes a halogen group, a trifluoromethoxy group, an acylthio group, an alkoxycarbonyl group, an acyloxy group, an alkylsulfoxide group, a trifluorothio group, an acyl group, a trifluoromethyl group, a cyano group, an alkylsulfonyl group, a nitro group, a trimethylammonium group, a dimethylsulfonium group, and a trifluoromethylsulfonyl group.

The reactivity and stability of the anionic polymerizable monomer may be controlled by a choice of X and Y. The stronger the electron attractivity of the group contained in the monomer, the greater the anionic polymerizability of the monomer is, so that the monomer can polymerize even in the presence of an initiator having low basicity. For instance, butadiene or styrene is known to polymerize in the presence of an initiator lithium, but does not react with alkoxy lithium. In view of reactivity, on the other hand, methyl methacrylate or acrylonitrile is more preferred because their reactivity is so stronger that they react with alkoxy lithium or phenoxy lithium, and so react and polymerizes with oxylithium formed on the surface of a carbonaceous anode. However, vinylidene cyanide is unstable because it polymerizes even in the presence of water due to its too high reactivity, resulting in the need of a complicated production process including perfect dehydration of solvents. It is thus preferable to make an appropriate selection from anionic polymerizable monomers having suitable reactivity depending on the type of the anode and the state of functional groups on the surface of the carbonaceous anode.

For the anionic polymerizable monomer, for instance, use may be made of at least one monomer selected from the group consisting of isoprene, styrene, 2-vinylpyridine, 1-vinylimidazole, butyl acrylate, ethyl acrylate, methyl methacrylate, N-vinylpyrrolidone, ethyl cinnamate, methyl cinnamate, ionone, and myrcene.

Concern is now mounting about long-term environmental toxicity and endocrine disruptors. Some artificial monomers capable of anionic polymerization are still not identified on whether or not they are safe in this regard. In the invention, it is thus preferable to make use of nature identical monomers such as terpenes or synthetic monomers started therefrom. For instance, isoprene, styrene, ethyl cinnamate, ionone, and myrcene should preferably be used.

To ensure stability, the anionic polymerizable monomer may further contain a trace amount of polymerization inhibitors such as quinones or catechols. To enhance reactivity, a compound that can act as a polymerization co-initiator may also be added to the monomer. Exemplary such substances are benzophenone, acetophenone, and p-methylacetophenone.

In the non-aqueous electrolyte secondary battery of the invention, the anode may be formed of a carbonaceous material capable of doping and dedoping lithium, for instance, graphitic materials such as natural graphite, artificial graphite, graphitized meso-carbon microbeads, and graphitized carbon fibers as well as various carbonaceous materials such as graphite precursor carbon.

Usable for the cathode active material, for instance, is at least one of composite oxides comprising at least one transition metal selected from cobalt, manganese and nickel, and lithium. More specifically, lithium cobaltate ($LiCoO_2$), lithium manganate ($LiMn_2O_4$), lithium nickelate ($LiNiO_2$) and their stoichiometric compounds may be used. In particular, batteries, each using graphite for an anode and a lithium manganate compound for a cathode, are not only light in weight, high in capacity and long in service life but are excellent in safety and reliability, and so may have wide applications as portable equipment batteries, car batteries, electrical car batteries, and road leveler batteries. If these cathode active substances are used for such batteries, it is then possible to prevent any possible lowering of the cycling performance thereof.

For the electrolyte, on the other hand, non-aqueous electrolytes obtained by dissolving carrier salts in non-aqueous solvents may be used.

Usable for the non-aqueous solvents, for instance, are ethylene carbonate, propylene carbonate, dimethyl carbonate, methylethyl carbonate, γ-butyrolactone, methyl propionate, butyl propionate, ethyl propionate, sulfolane, 1,2-dimethoxyethane, 1,2-diethoxyethane, tetrahydrofuran, 1,3-dioxolane, and 4-methyl-1,3-dioxolane, which may be used singly or in combination of two or more.

Usable for the carrier salts, for instance, are $LiClO_4$, $LiPF_6$, $LiAsF_6$, $LiSbF_6$, $LiBF_4$, $LiB(C_6H_5)_4$, $LiSO_3CF_3$, $LiN(SO_2CF_3)_2$ and $LiN(SO_2CF_2CF_3)$ which may be used singly or in combination of two or more.

According to the invention wherein the anionic polymerizable monomer having a specific structure is added to the non-aqueous electrolyte in the non-aqueous electrolyte battery, the anionic polymerizable monomer functions well to prevent any degradation of battery performance due to the reaction between the non-aqueous solvent in the electrolyte and the anode.

In the battery wherein such an anionic polymerizable monomer is added to the non-aqueous electrolyte, the anionic polymerizable monomer reacts with the anode going down to very low base potentials to form a very thin polymerized film on the surface of the anode, so that migration of electrons from the anode to the non-aqueous electrolyte can be inhibited, thereby inhibiting the reaction between the anode and the electrolyte.

In the battery of the invention, the formed polymer film is very thin and has a group that can interact with lithium ions, so that lithium ion conductivity can also be ensured.

Such a film on the surface of the anode may also be formed by the reaction between the non-aqueous solvent and the anode. However, the non-aqueous electrolyte is lower in film formation capabilities than the anionic polymerizable monomer, offering a problem that the once formed film may be again dissolved therein. Another problem is that battery performance may become low due to the generation of gases such as hydrogen, ethylene, and propylene. The polymer film formed of such an anionic polymerizable monomer is substantially free from such problems, and so is greatly favorable.

In a battery embodiment using the carbonaceous material for the anode, polymerization takes place from a start point on allyloxy lithium or allyl lithium, yielding a more stable film chemically bonded to the surface of the carbonaceous anode.

The reactivity of each anionic polymerizable monomer has been investigated at great length, and so a compound suitable for each individual battery system may be selected as desired. A compound, if it is of sufficient reactivity, can be used in a small amount.

According to the invention, it is found that the anionic polymerizable monomer can have sufficient effect in an amount of about 0.1% by weight to about 10% by weight per electrolyte.

Thus, the anionic polymerizable monomer of the invention can inhibit the reaction between the anode and the electrolyte without having any influence on the solubility and ion conductivity of the carrier salt used for the electrolyte whatsoever. For this reason, it is possible to use the electrolyte suitable for the solubility and ion conductivity of the carrier salt to ensure that the electrode material can make full use of its own performance. It is thus possible to provide a non-electrolyte battery having improved battery performance or being very excellent in terms of battery capacity, battery storability, and secondary battery's cycling characteristics.

One exemplary battery embodiment according to the invention is shown in FIG. 1 that is a partly cut-away perspective view of a thin battery 1 of rectangular shape in section. A cathode active substance is coated on a cathodic collector 3 with a separator 2 located between them, as in the case of a cylindrical battery, and an anode active substance is coated on an anodic collector 4. Then, these collectors are wound on each other to prepare a jelly roll 5 comprising a generating element, which is in turn placed in a battery can 6 with the pouring of an electrolyte therein. An upper header 7 is welded to the battery can 6 to obtain a battery as shown in FIG. 1. This battery can be used after charging.

By way of example and not by way of limitation, the present invention will now be explained with reference to inventive and comparative examples.

EXAMPLE 1

Preparation of Battery

A mixture consisting of 92 parts by weight of lithium manganate ($Li_{1+x}Mn_{2-x}O_4$) powders having a spinel structure, 5 parts by weight of carbon black and 3 parts by weight of polyvinylidene fluoride was coated on both surfaces of an aluminum foil of 3.75 cm in width, 27.5 cm in length and 20 μm in thickness to a total post-drying thickness of 178 μm including the thickness of the aluminum foil, thereby obtaining a cathode.

An anode was prepared by coating and drying a mixture consisting of 91 parts by weight of graphitized meso-carbon microbeads (made by Osaka Gas Co., Ltd.), 1 part by weight of carbon black and 8 parts by weight of polyvinylidene fluoride on a copper foil of 3.9 cm in width, 32 cm in length and 10 μm in thickness until a total post-drying thickness of 130 μm including the thickness of the copper foil was obtained.

The thus obtained cathode and anode were alternately laminated together with a microporous polypropylene film separator interleaved between them, and the laminate was wound on itself in a spiral form to prepare a generating element. Finally, the element was placed in a battery can.

A lithium ion secondary battery was built up by pouring in the battery can an electrolyte prepared by dissolving $LiPF_6$ at a concentration of 1.0 mol/l in a solvent mixture consisting of 30 parts by volume of ethylene carbonate and 70 parts by volume of diethyl carbonate and further dissolving isoprene at a concentration of 0.2% by weight therein.

Charging

The obtained lithium ion secondary battery was charged with a constant current to a terminal voltage of 4.2 V, from which the battery was switched over to a constant voltage charging mode. The total charging time was 10 hours as measured from the start of constant current charging.

Cycling Test

Figure 2:
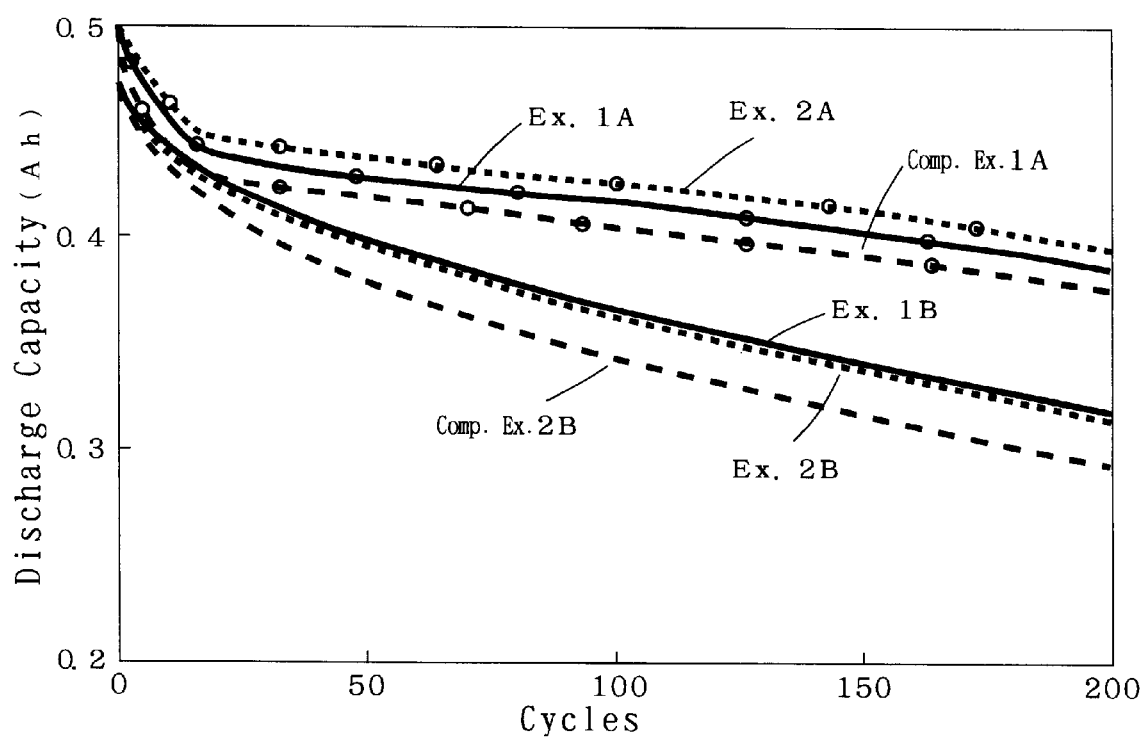
FIG. 2 is a schematic illustrative of charge-and-discharge characteristics of the inventive battery and a comparative battery.

The battery was stored for 1 week at 20° C. after charging. Then, a cycling test where discharging at a discharge rate of 1C (0.4 A) and charging at a charge rate of 1C were repeated was carried out at 20°C. to obtain such discharge capacity changes as shown at Ex. 1A in FIG. 2. Results of similar testing at 45° C. are shown at Ex. 1B in FIG. 2.

EXAMPLE 2

A non-aqueous electrolyte secondary battery was prepared following Example 1 with the exception that 0.1% by weight of isoprene was dissolved in the electrolyte. A cycling test was carried out as in Example 1. Discharge capacity changes are shown at Ex. 2A in FIG. 1. Results of similar testing at 45° C. are also shown at Ex. 2B in FIG. 2.

EXAMPLE 3

Preparation of Battery

A mixture consisting of 78 parts by weight of lithium manganate ($Li_{1+x}Mn_{2-x}O_4$) powders having a spinel structure, 14 parts by weight of nickel lithium cobaltate ($LiNi_{0.8}Co_{0.2}O_4$) powders, 5 parts by weight of carbon black and 3 parts by weight of polyvinylidene fluoride was coated on both surfaces of an aluminum foil of 5.5 cm in width, 67.0 cm in length and 20 μm in thickness to a total post-drying thickness of 139 μm including the thickness of the aluminum foil, thereby obtaining a cathode.

An anode was prepared by coating and drying a mixture consisting of 68 parts by weight of graphitized meso-carbon microbeads (MCMB made by Osaka Gas Co., Ltd.), 23 parts by weight of artificial graphite, 1 part by weight of carbon black and 8 parts by weight of polyvinylidene fluoride on a copper foil of 5.75 cm in width, 72.3 cm in length and 10 μm in thickness until a total post-drying thickness of 130 μm including the thickness of the copper foil was obtained.

The thus obtained cathode and anode were alternately laminated together with a microporous polypropylene film separator interleaved between them, and the laminate was wound on itself in a spiral form to prepare a generating element. Finally, the element was placed in a battery can.

A lithium ion secondary battery was built up by pouring in the battery can an electrolyte prepared by dissolving $LiPF_6$ at a concentration of 1.0 mol/l in a solvent mixture consisting of 30 parts by volume of ethylene carbonate and 70 parts by volume of diethyl carbonate and further dissolving ethyl cinnamate at a concentration of 0.2% by weight therein.

Charging

The obtained lithium ion secondary battery was charged with a constant current to a terminal voltage of 4.2 V, from which the battery was switched over to a constant voltage charging mode. The total charging time was 10 hours as measured from the start of constant current charging.

Cycling Test

Figure 3:
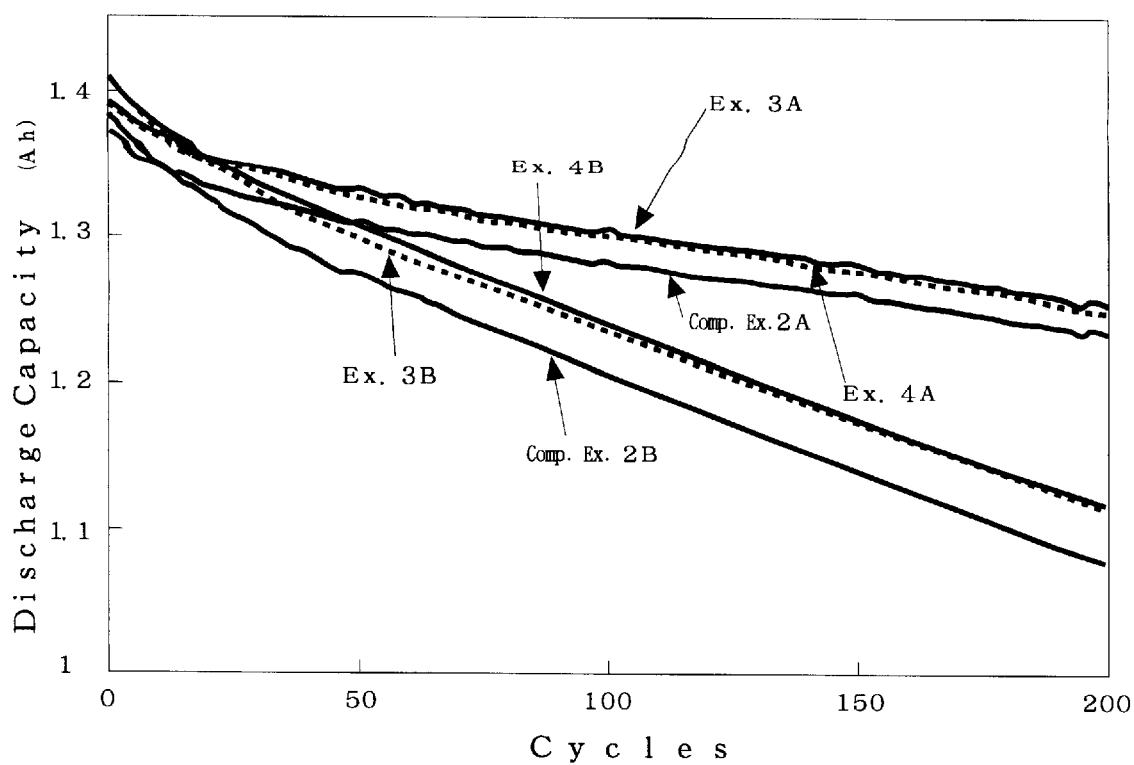
FIG. 3 is a schematic illustrative of charge-and-discharge characteristics of the inventive battery and a comparative battery.

The battery was stored for 1 week at 20° C. after charging. Then, a cylcling test where discharging at a discharge rate of 1C (0.4 A) and charging at a charge rate of 1C were repeated was carried out at 20° C. to obtain such discharge capacity changes as shown at Ex. 3A in FIG. 3. Results of similar testing at 45° C. are shown at Ex. 3B in FIG. 3, and discharge capacities are set out in Table 1.

EXAMPLE 4

A non-aqueous electrolyte secondary battery was prepared following Example 3 with the exception that 0.2% by weight of α-ionone was dissolved in the electrolyte. A cycling test was carried out as in Example 3. Discharge capacity changes are shown at Ex. 4A in FIG. 3. Results of similar testing at 45° C. are also shown at Ex. 4B in FIG. 3, and discharge capacities are set out in Table 1 as well.

Comparative Example 1

A non-aqueous electrolyte secondary battery was prepared following Example 1 with the exception that no isoprene was dissolved in the electrolyte. A cycling test was carried out as in Example 1. Discharge capacity changes are shown at Comp. Ex. 1A in FIG. 2. Results of similar testing at 45° C. are also shown at Comp. Ex. 1B in FIG. 2.

Comparative Example 2

A non-aqueous electrolyte secondary battery was prepared following Example 3 with the exception that no ethyl cinnamate was dissolved in the electrolyte. A cycling test was carried out as in Example 3. Discharge capacity changes are shown at Comp. Ex. 2A in FIG. 3. Results of similar testing at 45 ° C. are also shown at Comp. Ex. 2B in FIG. 3, and discharge capacities are set out in Table 1 as well.

EXAMPLE 5

Non-aqueous electrolytes were prepared following Example 3 with the exception that myrcene, butyl acrylate, and 2-vinylpyridine, each in an amount of 0.2% by weight, were dissolved in electrolytes. Cycling tests were carried out as in Example 3. Results of the cycling tests are set out in Table 1.

TABLE 1

| | Additive | 1 cycle | 10 cycles | 50 cycles |
|---|---|---|---|---|
| Ex. 3 | ethyl cinnamate | 1.411 | 1.378 | 1.301 |
| Ex. 4 | α-ionone | 1.408 | 1.378 | 1.309 |
| Ex. 5 | myrcene | 1.384 | 1.357 | 1.281 |
| Ex. 5 | butyl acrylate | 1.389 | 1.360 | 1.279 |
| Ex. 5 | 2-vinylpyridine | 1.407 | 1.375 | 1.297 |
| Comp. Ex. 2 | none | 1.384 | 1.352 | 1.276 |

According to non-aqueous battery of the present invention, the selected anionic polymerizable monomer is added to the non-aqueous electrolyte, thereby making it possible to inhibit the reaction between the anode and the electrolyte without having any adverse influence on the solubility and ion conductivity of the carrier salt, as can be understood from the foregoing explanation. This in turn enables the electrode material to make full use of its own performance, and so can provide a non-aqueous electrolyte battery improved in terms of battery performance, especially battery capacity, battery storability and secondary battery's cycling characteristics.

What we claim is:

1. A non-aqueous electrolyte battery comprising an anode of a carbonaceous material capable of doping and dedoping lithium, wherein:

a non-aqueous electrolyte comprises at least one monomer capable of anionic polymerization which, upon charging, forms a film on a surface of the carbonaceous material anode, said monomer capable of anionic polymerization is a monomer of natural product or a synthetic monomer started from said monomer of natural product.

2. The non-aqueous electrolyte battery according to claim 1, wherein the monomer is selected from the group consisting of isoprene, 2-vinylpyridine, ethyl cinnamate, methyl cinnamate, ionone, and myrcene.

3. The non-aqueous electrolyte battery according to claim 1, wherein a cathode active material comprises at least one composite oxide comprising lithium and at least one transition metal selected from the group consisting of cobalt, manganese and nickel.

4. The non-aqueous electrolyte battery according to claim 2, wherein a cathode active material comprises at least one composite oxide comprising lithium and at least one transition metal selected from the group consisting of cobalt, manganese and nickel.

* * * * *